US012671661B2

(12) United States Patent
Zhao

(10) Patent No.: US 12,671,661 B2
(45) Date of Patent: Jun. 30, 2026

(54) CONVERGED DATA EXCHANGE METHOD AND TIME-SENSITIVE NETWORK SWITCH

(71) Applicant: ZHEJIANG LAB, Hangzhou City (CN)

(72) Inventor: Xuyang Zhao, Hangzhou City (CN)

(73) Assignee: ZHEJIANG LAB, Hangzhou City (CN)

( * ) Notice: Subject to any disclaimer, the term of this patent is extended or adjusted under 35 U.S.C. 154(b) by 391 days.

(21) Appl. No.: 18/550,418

(22) PCT Filed: Apr. 11, 2023

(86) PCT No.: PCT/CN2023/087620
§ 371 (c)(1),
(2) Date: Sep. 13, 2023

(87) PCT Pub. No.: WO2024/169029
PCT Pub. Date: Aug. 22, 2024

(65) Prior Publication Data
US 2025/0039105 A1     Jan. 30, 2025

(30) Foreign Application Priority Data

Feb. 16, 2023     (CN) .......................... 202310120725.3

(51) Int. Cl.
*H04L 47/6275*     (2022.01)
*H04L 47/12*     (2022.01)
*H04L 47/2425*     (2022.01)

(52) U.S. Cl.
CPC .......... *H04L 47/6275* (2013.01); *H04L 47/12* (2013.01); *H04L 47/2433* (2013.01)

(58) Field of Classification Search
CPC .. H04L 47/12; H04L 47/2433; H04L 47/6275
See application file for complete search history.

(56) References Cited

U.S. PATENT DOCUMENTS 10,447,606 B2 * 10/2019 Bush ................... H04L 47/2441
2003/0048792 A1     3/2003 Xu et al.
(Continued)

FOREIGN PATENT DOCUMENTS

CN           1728682 A     2/2006
CN      101834787 A     9/2010
(Continued)

OTHER PUBLICATIONS

ISA State Intellectual Property Office of the People's Republic of China, International Search Report Issued in Application No. PCT/CN2023/087620, Nov. 6, 2023, WIPO, 6 pages. (Submitted with Machine Translation).

(Continued)

*Primary Examiner* — Melanie Jagannathan
(74) *Attorney, Agent, or Firm* — Carroll, Hoette & Butscher, LLC; Christopher R. Carroll

(57) ABSTRACT

A converged data exchange method and a time-sensitive network switch are provided in the present disclosure. The network switch device performs sensitivity identification for the data to be forwarded. For the switching transmission of non-time-sensitive data, the push port queue and the pop port queue perform cut-through switching for the data, which reduces the residence time of the data packet in the switch device. For time-sensitive data, the push port queue and pop port queue forward the data according to the corresponding priority scheduling policies.

8 Claims, 1 Drawing Sheet

(56) References Cited

U.S. PATENT DOCUMENTS

| | | | |
|---|---|---|---|
| 2011/0035751 A1* | 2/2011 | Krishnakumar | G06F 9/4881 |
| | | | 718/103 |
| 2016/0006580 A1* | 1/2016 | Lamb | H04L 45/745 |
| | | | 370/254 |
| 2018/0183724 A1* | 6/2018 | Callard | H04L 47/6295 |
| 2019/0289616 A1* | 9/2019 | Hampel | H04B 7/0413 |
| 2020/0068428 A1* | 2/2020 | Meylan | H04L 47/2441 |
| 2021/0014177 A1* | 1/2021 | Kasichainula | H04L 49/901 |
| 2021/0258264 A1* | 8/2021 | Gogolev | H04L 69/08 |
| 2022/0140930 A1* | 5/2022 | Mehmedagic | H04L 41/0654 |
| | | | 370/503 |
| 2022/0239782 A1* | 7/2022 | Kim | H04M 7/0081 |
| 2023/0096468 A1* | 3/2023 | Ong | H04L 47/2441 |
| | | | 370/235 |
| 2023/0275852 A1* | 8/2023 | Benzaoui | H04J 3/0661 |
| | | | 370/355 |
| 2023/0283560 A1* | 9/2023 | Jabbar | H04L 47/225 |
| | | | 370/230.1 |
| 2024/0089213 A1* | 3/2024 | Tao | H04L 47/6275 |
| 2024/0129247 A1* | 4/2024 | Gogolev | H04L 43/55 |
| 2024/0236012 A1* | 7/2024 | Mangin | H04L 47/564 |
| 2024/0250915 A1* | 7/2024 | Jeon | H04L 12/66 |
| 2024/0250928 A1* | 7/2024 | Liu | H04L 45/745 |

FOREIGN PATENT DOCUMENTS

| | | | |
|---|---|---|---|
| CN | 104717159 A | 6/2015 |
| CN | 111327540 A | 6/2020 |
| CN | 112105080 A | 12/2020 |
| CN | 114201427 A | 3/2022 |
| CN | 115665057 A | 1/2023 |
| IN | 201637041331 A | 4/2017 |

OTHER PUBLICATIONS

ISA State Intellectual Property Office of the People's Republic of China, Written Opinion of the International Searching Authority Issued in Application No. PCT/CN2023/087620, Nov. 6, 2023, WIPO, 6 pages. (Submitted with Machine Translation).

State Intellectual Property Office of the People's Republic of China, Office Action and Search Report Issued in Application No. 2023101207253, May 9, 2023, 7 pages.

Wang Xue-shunl et al. "Fuzzy Congestion Control Algorithm Based on Accumulative Traffic Delay", Computer Science, Jul. 15, 2010, 6 pages.

* cited by examiner

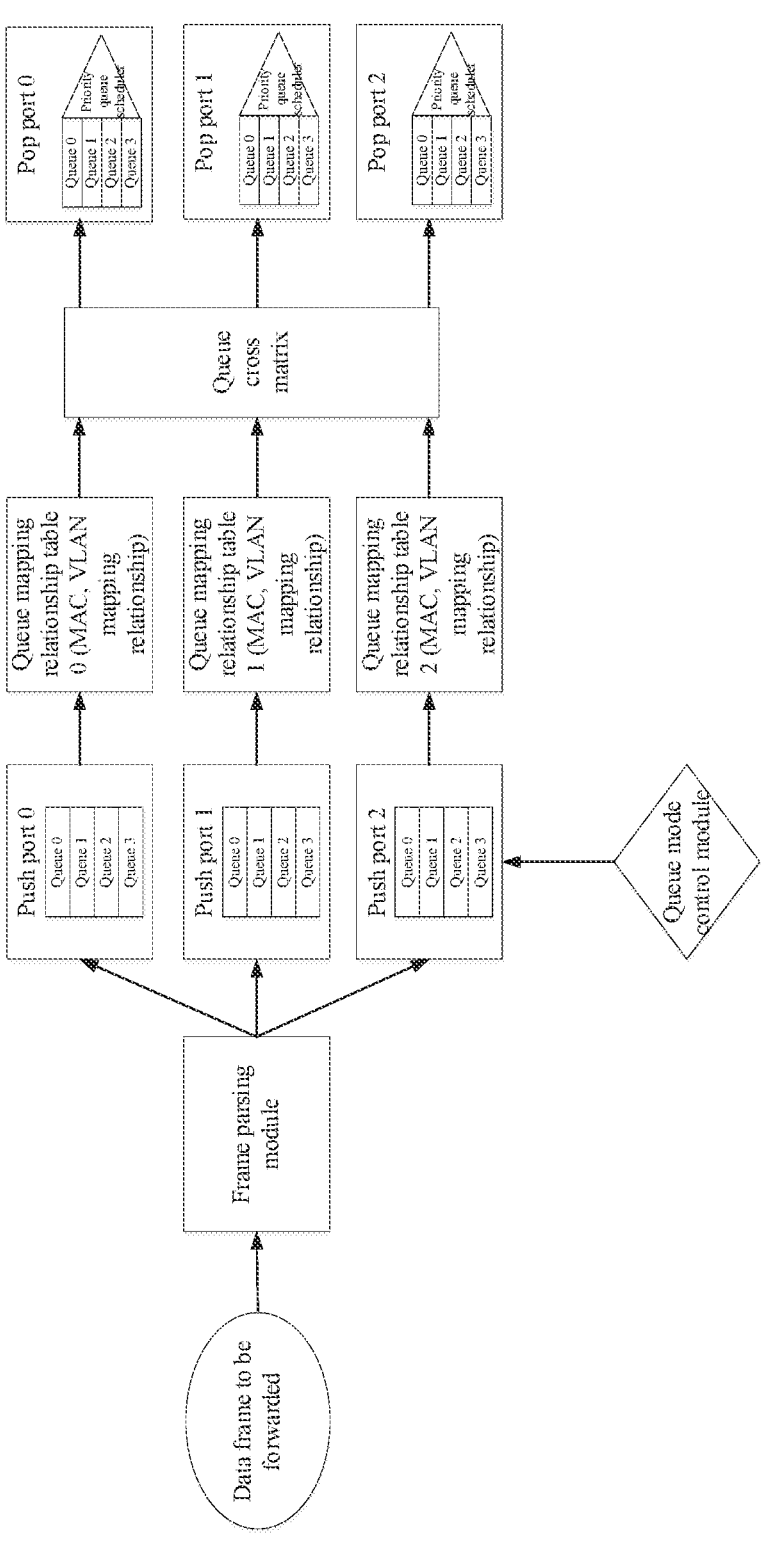

CONVERGED DATA EXCHANGE METHOD AND TIME-SENSITIVE NETWORK SWITCH

CROSS-REFERENCE TO RELATED APPLICATIONS

This application is a national stage of International Application No. PCT/CN2023/087620, filed on Apr. 11, 2023, which is hereby incorporated by reference in its entirety.

TECHNICAL FIELD

The present disclosure relates to the technical field of deterministic exchange of hybrid data, in particular to a converged data exchange method and a time-sensitive network switch.

BACKGROUND

With development of new-generation information and communication technologies such as the Internet of Things (IoT), 5G, and the Industrial Internet, the pace of transformation and upgrading of traditional industries is accelerated, and the communication demand for the Internet of Everything has increased. Traditional Ethernet no longer meets the demand for increasing data and widely distributed networks. With the development of industrial Internet technology, there is a demand for data transmission services in the network with higher reliability, low-latency and low-jitter.

Conventional Ethernet typically uses a "Best Effort" mode of forwarding, which often lacks determinacy. When a data packet arrives at a sending port and is ready to be sent, the sending end forwards the data packet according to the principle of first in, first out. But when a sending port has multiple pieces of data to be sent at the same time, the data to be forwarded has to be queued. Waiting time in the queue is determined by multiple factors such as queue length and data transmission speed. If the traffic in the network is too large, congestion or data packet loss will occur, the queuing waiting time will become unpredictable, and the determinateness cannot be guaranteed, causing problems such as traffic scheduling, time synchronization, traffic monitoring, and standardization of fault tolerance mechanisms.

Store-and-forward is one of the most widely used techniques in computer networking. The controller of an Ethernet switch caches data packets from the input port, checks whether data frames are correct or not, and filters out conflicting data packet errors. Verified data frames will be taken out from a destination address and sent by querying an output port address that needs to send data in a lookup table. With the development of industrial Internet technology, there is a demand for data transmission services in the network with higher reliability, low-latency and low-jitter. The traditional store-and-forward method has a large delay during data processing and has error detection for data packets entering the switch, which leads to long processing time for time-sensitive data in the switch device and affects the efficiency of industrial production.

SUMMARY

Based on the above technical ideas, a converged data exchange method and a time-sensitive network switch are provided in the present disclosure.

A converged data exchange method is provided in this present disclosure, performed by a time-sensitive network switch, including:

receiving a to-be-forwarded data frame from a front-end link device, and identifying priority flag information of the to-be-forwarded data frame;

identifying a data type of the to-be-forwarded data frame based on the priority flag information of the to-be-forwarded data frame, categorizing the to-be-forwarded data frame as time-sensitive data or non-time-sensitive data according to the data type of the to-be-forwarded data frame; and assigning the time-sensitive data or the non-time-sensitive data to a push port queue according to priority;

where, when the to-be-forwarded data frame is categorized as the time-sensitive data, the push port queue schedules the time-sensitive data according to priority during a transmission process of the time-sensitive data, and when the to-be-forwarded data frame is categorized as the non-time sensitive data, the push port queue buffers and stores the non-time-sensitive data during a transmission process of the non-time-sensitive data: the push port queue obtains a destination MAC address of the time-sensitive data or a destination MAC address of the non-time-sensitive data by querying a queue mapping relationship table and forwards the time-sensitive data or the non-time-sensitive data to a corresponding pop port queue through a queue cross matrix based on the destination MAC address of the time-sensitive data or the destination MAC address of the non-time-sensitive data;

the pop port queue forwards the time-sensitive data or the non-time-sensitive data to a back-end link device according to priority.

A time-sensitive network switch is provided in the present disclosure, including: a storage medium storing computer executable instructions: a processor capable of executing the computer executable instructions: a push port; and a pop port.

Where, when the computer readable instructions are executed by the processor, the processor is configured to perform operations including: receiving a to-be-forwarded data frame from a front-end link device, and identifying priority flag information of the to-be-forwarded data frame: identifying a data type of the to-be-forwarded data frame based on the priority flag information of the to-be-forwarded data frame, categorizing the to-be-forwarded data frame as time-sensitive data or non-time-sensitive data according to the data type of the to-be-forwarded data frame; and assigning time-sensitive data or non-time-sensitive data to a push port queue of the push port according to priority:

where, when the to-be-forwarded data frame is categorized as the time-sensitive data, the push port queue schedules the time-sensitive data according to priority during a transmission process of the time-sensitive data, and when the to-be-forwarded data frame is categorized as the non-time sensitive data, the push port queue buffers and stores the non-time-sensitive data during a transmission process of the non-time-sensitive data: the push port queue obtains a destination MAC address of the time-sensitive data or a destination MAC address of the non-time-sensitive data by querying a queue mapping relationship table and forwards the time-sensitive data or the non-time-sensitive data to the push port queue of the push port through a queue cross matrix based on the destination MAC address of the time-sensitive data or the destination MAC address of the non-time-sensitive data;

where, the pop port queue forwards the time-sensitive data or the non-time-sensitive data to a back-end link device according to priority.

The network switch device in this disclosure performs sensitivity identification for the to-be-forwarded data. For the switching transmission of non-time-sensitive data, the push port queue and the pop port queue are configured to realize the function of data packet buffering. The data packet can be forwarded to the corresponding port through the queue cross matrix directly according to the destination MAC address of the data packet by looking up the queue mapping relationship table, which reduces the residence time of the data packet in the switch device. For time-sensitive data, the queue mode control module can distinguish the priority of data frames, and schedule data frames with different priorities to the corresponding priority queues. The data frames can be forwarded to the corresponding priority pop port queues according to the destination MAC addresses of the data packets after looking up the queue mapping relationship table. The push port queues and pop port queues forward the data according to the corresponding priority scheduling policies. The traditional store-and-forward method has a large delay in data processing and has error detection for data packets entering the switch, which leads to long processing time for time-sensitive data in the switch device and affects the efficiency of industrial production. In the present disclosure, fast forwarding processing for different types of data frames is realized by using different exchanging strategies for different types of data frames in the same device, solving the problem that long processing time of time-sensitive data in the exchanging device, caused by the traditional store-and-forward method, affects the efficiency of industrial production.

BRIEF DESCRIPTION OF DRAWINGS

FIG. 1 is a framework diagram of the converged data exchange according to embodiments in the present disclosure.

DETAILED DESCRIPTION

Embodiments of the present disclosure will be described in detail below with reference to the accompanying drawings.

As shown in FIG. 1, a converged data exchange device is provided in the present disclosure. The device includes a frame parsing module, a queue mode control module, a push port queue, a queue mapping relationship table, a queue cross matrix, and a pop port queue.

The frame parsing module is configured to parse the priority flag of Ethernet data frames and send the parsing results to the queue mode control module.

In an embodiment, the frame parsing module parses the priority flag, Priority Code Point, in the 802.1Q field of an Ethernet data frame. The length of priority flag, Priority Code Point, is 3 bit. If the parsing result of the priority flag is a reserved empty byte, it indicates that the Ethernet data frame is non-time-sensitive data. If the parsing result of the priority flag is 000, 001, 010, or 011, it indicates that the Ethernet data frame is time-sensitive data. During the process of parsing, the VLAN (Virtual Local Area Network) field, the source MAC (Media Access Control) address field, and the destination MAC address field of the Ethernet data frame are extracted. The queue mode control module identifies the data type of data frame to be forwarded through the parsing result sent by the frame parsing module, categorizes the data as time-sensitive data or non-time-sensitive data based on the data frame type, and then assigns the time-sensitive data and non-time-sensitive data to the push port queue according to priority.

In an embodiment, the queue mode control module identifies the data type of the data frame to be forwarded. If the identification result of the data frame type is time-sensitive data, the queue mode control module is set to 1, and the push port queue and pop port queue schedule the time-sensitive data based on the priority of time-sensitive data. If the identification result of the data frame type is non-time-sensitive data, the queue mode control module is set to 0, and at this time, the push port queue and pop port queue do not distinguish priority, and perform data exchange for Ethernet data frame according to the QoS mechanism.

The push port queue schedules the time-sensitive data according to priority during the transmission process of the time-sensitive data, and buffers and stores the non-time-sensitive data during the transmission process of the non-time-sensitive data. The push port queue obtains the destination MAC address of the time-sensitive data and the destination MAC address of the non-time-sensitive data by querying a queue mapping relationship table and forwards the time-sensitive data and the non-time-sensitive data to the push port queue of the push port by a queue cross matrix based on the destination MAC address of the time-sensitive data and the destination MAC address of the non-time-sensitive data. Operation modes of the push port queue include: discard mode, port flow control mode, and priority-based flow control mode.

In the discard mode, if the push port queue fails to identify the congestion status, all frames received by the push port queue are evaluated by a congestion control function, where copied frames are discarded.

In the port flow control mode, the front-end link device is notified by a pause frame or a conflict message that the push port queue cannot accept more data. If the link device identifies a pause request, the push port queue does not discard any incoming data. If the link device does not identify the pause frame or the conflict message, a buffer control function of the push port queue discards data when the data arrives at the push port queue.

In the priority-based flow control mode, if the link device is notified of QoS class congestion policy in the push port queue by a pause frame, the link device stops scheduling QoS class data frames: if the link device does not identify the pause frame or the conflict message, a buffer control function of the push port queue discards data before the data arrives at the push port queue.

The queue mapping relationship table is used for the data exchange processing information table maintained by the exchange device, including a CAM (Content Addressable Memory) table and a vlan.data table. The CAM table is configured to save obtained MAC addresses and forward the data frame to the corresponding destination MAC address port. The vlan.data table is configured to save VLAN-related information, which is mainly used to control the traffic forwarding of corresponding VLANs, simplify network management, and discard non VLAN field information to improve network security.

In an embodiment, the data frames to be forwarded are fully stored and verified the correct frame check sequence (FCS) before being forwarded to the push port queue. In response that one of the following conditions is satisfied, the transmission of data frames to be forwarded is performed according to the cut-through switching mode: (1) cut-through switching is enabled in the push port queue and in priority, and a flag of the queue mode control module is set as 1; (2) cut-through switching is enabled in the pop port queue and in priority, and a flag of the queue mode control module is set as 1; (3) a working rate of the pop port queue is lower than that of the push port queue, and cut-through switching is enabled based on a configured speed of each pop port queue. But if the pop rate value is greater than the push rate value, cut-through switching is not performed.

The queue cross matrix uses an interconnection matrix to interconnect the processed data frames with the pop ports in a many-to-many manner, and achieves fast exchange and processing of data frames by direct forwarding of the data frames.

The pop port queue forwards the time-sensitive data and the non-time-sensitive data to the back-end link device according to priority.

There are several push port queues, queue mapping relationship tables, and pop port queues and there is one-to-one correspondence relationship among them. For example, a queue mapping relationship table 0 stores to-be-forwarded data entered from a push port 0. Based on a MAC address table and a VLAN table in the queue mapping relationship table 0, searching for the MAC address and VLAN related information of the data to be forwarded is performed, and the to-be-forwarded data is forwarded to the corresponding pop port.

In some embodiments, a converged data exchange method is further provided in the present disclosure, performed by a time-sensitive network switch, specifically including steps S1 to S4.

S1: a to-be-forwarded data frame transmitted from a front-end link device is received, and priority flag information of the to-be-forwarded data frame is identified;

S2: a data type of the to-be-forwarded data frame is identified based on the priority flag information of the to-be-forwarded data frame, the to-be-forwarded data frame is categorized as time-sensitive data or non-time-sensitive data according to the type of the to-be-forwarded data frame; and the time-sensitive data or the non-time-sensitive data is assigned into a push port queue according to priority;

S3: the push port queue schedules the time-sensitive data according to priority during a transmission process of the time-sensitive data, and buffers and stores the non-time-sensitive data during the transmission process of the non-time-sensitive data: the push port queue obtains a destination MAC address of the time-sensitive data or a destination MAC address of the non-time-sensitive data by querying a queue mapping relationship table and forwards the time-sensitive data or the non-time-sensitive data to a corresponding pop port queue through a queue cross matrix based on the destination MAC address of the time-sensitive data or the destination MAC address of the non-time-sensitive data.

S4: the pop port queue forwards the time-sensitive data or the non-time-sensitive data to the back-end link device according to priority.

In an embodiment, as shown in FIG. 1, the network switching device includes a frame parsing module, a queue mode control module, push port queue 0 push port queue 1, push port queue 2, queue mapping relationship table 0, queue mapping relationship table 1, queue mapping relationship table 2, queue cross matrix, pop port queue 0 pop port queue 1, and pop port queue 2.

The data frame to be forwarded enters the data exchange device, and the frame parsing module verifies Ethernet data frames and identifies data types of the data frames. For a data frame with a failed verification, the data frame is directly discarded. For a complete Ethernet data frame, a priority flag is extracted to determine the data type.

In an example, the Priority Code Point field is empty, indicating that the data belongs to non-time-sensitive data. At this time, the queue mode control module is set to 0, and the push port queue and pop port queue do not distinguish priority, and perform data exchange for Ethernet data frame according to QoS mechanism. At this time, queues in the pop port are not distinguished by priority, and the function of the queue is as a data buffer, so as to improve the data storage and forwarding performance of the port.

In an example, the Priority Code Point field takes values of 0 to 3, indicating that the data belongs to time-sensitive data. At this time, the queue mode control module is set to 1, and the push port queue performs scheduling based on the priority of time-sensitive data. The data frame is assigned in the corresponding push port queue based on the value of the priority flag Priority Code Point. For example, data with field 0 enters queue 0 the data with field 1 enters queue 1: the data with field 2 enters queue 2: the data with field 3 enters queue 3.

When the time-sensitive data to be forwarded arrives at the queue mapping relationship table. MAC and VLAN information can be searched, the forwarding destination MAC address and VLAN domain of the time-sensitive data can be obtained.

Based on the obtained forwarding destination MAC address and VLAN domain, time-sensitive data is forwarded to the corresponding pop port through the queue cross matrix. At the pop port, priorities of time-sensitive data are also assigned. The pop port schedules time-sensitive data according to a predetermined priority scheduling order of the time-sensitive data. For example, the data with field 0 enters pop queue 0 the data with field 1 enters pop queue 1; the data with field 2 enters pop queue 2: the data with field 3 enters pop queue 3.

In some embodiments, a time-sensitive network switch is also provided in the present disclosure, including: a storage medium storing computer executable instructions: a processor capable of executing the computer executable instructions: a push port; and a pop port.

When the computer readable instructions are executed by the processor, the processor is configured to perform following operations. Receiving a to-be-forwarded data frame from a front-end link device, and identifying priority flag information of the to-be-forwarded data frame. Identifying a data type of the data frame to be forwarded based on the priority flag information of the to-be-forwarded data frame, categorizing the to-be-forwarded data frame as time-sensitive data or non-time-sensitive data according to the type of the to-be-forwarded data frame; and assigning the time-sensitive data or the non-time-sensitive data to a push port queue of the push port according to priority.

The push port queue schedules the time-sensitive data according to priority during the transmission process of the time-sensitive data, and buffers and stores the non-time-sensitive data during the transmission process of the non-time-sensitive data. The push port queue obtains the destination MAC address of the time-sensitive data or the destination MAC address of the non-time-sensitive data by querying a queue mapping relationship table and forwards the time-sensitive data or the non-time-sensitive data to the push port queue of the push port through a queue cross matrix based on the destination MAC address of the time-sensitive data or the non-time-sensitive data;

The pop port queue forwards the time-sensitive data or the non-time-sensitive data to the back-end link device according to priority.

In an embodiment, for each of the data frames, identifying a data type of the data frame to be forwarded based on priority flag information of the data frame to be forwarded includes: analyzing the priority flag Priority Code Point in the 802.1Q field of the data frame to be forwarded, and obtaining the priority flag information of the data frame to be forwarded.

In an embodiment, a length of the priority flag Priority Code Point is 3 bits, for each of the data frames, identifying the data type of the data frame to be forwarded based on priority flag bit information of the data frame to be forwarded, categorizing the data frame to be forwarded as time-sensitive data or non-time-sensitive data according to the type of the data frame to be forwarded includes: in response to determining that the priority flag of the data frame to be forwarded is a reserved empty byte, determining that the data frame to be forwarded is non-time-sensitive data: in response to determining that the priority flag of the data frame to be forwarded is 000, 001, 010, or 011, determining that the data frame to be forwarded is time-sensitive data.

In an embodiment, when the computer readable instructions are executed by the processor, the processor is configured to perform following operations. Extracting the VLAN field, source MAC address field, and destination MAC address field of the data frame to be forwarded; and saving the VLAN field, source MAC address filed, and destination MAC address field of the data frame to be forwarded in a queue mapping relationship table in the storage medium.

In an embodiment, in response to determining that the type of data frame to be forwarded is time-sensitive data, the push port queue and the pop port queue perform scheduling based on the priority of the time-sensitive data: in response to determining that the type of data frame to be forwarded is non-time-sensitive data, the push port queue and the pop port queue do not distinguish priority, and perform Ethernet data frame exchange according to QoS mechanism.

In an embodiment, operation modes of the push port queue include: discard mode, port flow control mode, and priority-based flow control mode.

In the discard mode, in response to push port queue fails to identify congestion status, all frames received by the push port queue are evaluated by a congestion control function, where the copied frames are discarded.

In the port flow control mode, the front-end link device is notified by a pause frame that the push port queue cannot accept more data, and in response to the link device identifying a pause request, the push port queue does not discard any incoming data; in response to the link device not identifying the pause frame, a buffer control function of the push port queue discards data when the data arrives at the push port queue.

In the priority-based flow control mode, in response to the link device being notified of QoS class congestion policy in the push port queue by a pause frame, the link device stops scheduling QoS class data frames; in response to the link device not identifying the pause frame, a buffer control function of the push port queue discards data before the data arrives at the push port queue.

The above is only a preferred embodiment of this disclosure and is not intended to limit it. For those skilled in the art, there may be various modifications and variations to this disclosure. Any modifications, equivalent replacements, improvements, etc. made within the spirit and principles of this disclosure shall be included within the scope of protection of this disclosure.

The invention claimed is:

1. A converged data exchange method, performed by a time-sensitive network switch, comprising:

receiving a to-be-forwarded data frame from a front-end link device, and identifying priority flag information of the to-be-forwarded data frame;

identifying a data type of the to-be-forwarded data frame based on the priority flag information of the to-be-forwarded data frame, categorizing the to-be-forwarded data frame as time-sensitive data or non-time-sensitive data according to the data type of the to-be-forwarded data frame; and assigning the time-sensitive data or the non-time-sensitive data to a push port queue according to priority;

wherein, when the to-be-forwarded data frame is categorized as the time-sensitive data, the push port queue schedules the time-sensitive data according to priority during a transmission process of the time-sensitive data, and when the to-be-forwarded data frame is categorized as the non-time sensitive data, the push port queue buffers and stores the non-time-sensitive data during a transmission process of the non-time-sensitive data; the push port queue obtains a destination MAC address of the time-sensitive data or a destination MAC address of the non-time-sensitive data by querying a queue mapping relationship table, and forwards the time-sensitive data or the non-time-sensitive data to a corresponding pop port queue through a queue cross matrix based on the destination MAC address of the time-sensitive data or the destination MAC address of the non-time-sensitive data;

the pop port queue forwards the time-sensitive data or the non-time-sensitive data to a back-end link device according to priority;

wherein identifying the data type of the to-be-forwarded data frame based on the priority flag information of the to-be-forwarded data frame comprises:

analyzing a priority flag, Priority Code Point, in an 802.1Q field of the to-be-forwarded data frame, to obtain the priority flag information of the to-be-forwarded data frame;

wherein a length of the priority flag, Priority Code Point, is 3 bits, identifying the data type of the to-be-forwarded data frame based on the priority flag information of the to-be-forwarded data frame, categorizing the to-be-forwarded data frame as the time-sensitive data or the non-time-sensitive data according to the data type of the to-be-forwarded data frame, comprises:

in response to determining that the priority flag of the to-be-forwarded data frame is a reserved empty byte, determining that the to-be-forwarded data frame is the non-time-sensitive data;

in response to determining that the priority flag of the to-be-forwarded data frame is 000, 001, 010, or 011, determining that the to-be-forwarded data frame is the time-sensitive data.

2. The method according to claim 1, further comprising:

extracting a VLAN field, a source MAC address filed, and a destination MAC address field of the to-be-forwarded data frame.

3. The method according to claim 1, further comprising:

in response to determining that the data type of the to-be-forwarded data frame is the time-sensitive data, the push port queue and the pop port queue perform scheduling based on priority of the time-sensitive data;

in response to determining that the data type of to-be-forwarded data frame is the non-time-sensitive data, the push port queue and the pop port queue perform Ethernet data frame exchange according to QoS mechanism.

4. The method according to claim 1, wherein operation modes of the push port queue comprise: a discard mode, a port flow control mode, and a priority-based flow control mode;

in the discard mode, in response to the push port queue failing to identify congestion status, all frames received by the push port queue are evaluated by a congestion control function, wherein copied frames are discarded;

in the port flow control mode, the front-end link device is notified by a pause frame that the push port queue is not able to accept more data; in response to the front-end link device identifying a pause request, the push port queue does not discard any incoming data; in response to the front-end link device not identifying the pause frame, a buffer control function of the push port queue discards data when the data arrives at the push port queue;

in the priority-based flow control mode, in response to the front-end link device being notified of QoS class congestion policy in the push port queue by a pause frame, the front-end link device stops scheduling QoS class data frames; in response to the front-end link device not identifying the pause frame, a buffer control function of the push port queue discards data before the data arrives at the push port queue.

5. A time-sensitive network switch, comprising:

a storage medium storing computer executable instructions;

a processor capable of executing the computer executable instructions;

a push port;

a pop port;

wherein, when the computer readable instructions are executed by the processor, the processor is configured to perform operations comprising:

receiving to-be-forwarded data frames from a front-end link device, and identifying priority flag information of the to-be-forwarded data frames;

identifying a data type of the to-be-forwarded data frame based on the priority flag information of the to-be-forwarded data frame, categorizing the to-be-forwarded data frame as time-sensitive data or non-time-sensitive data according to the data type of the to-be-forwarded data frame; and assigning the time-sensitive data or the non-time-sensitive data to a push port queue of the push port according to priority;

wherein, when the to-be-forwarded data frame is categorized as the time-sensitive data, the push port queue schedules the time-sensitive data according to priority during a transmission process of the time-sensitive data, and when the to-be-forwarded data frame is categorized as the non-time sensitive data, the push port queue buffers and stores the non-time-sensitive data during a transmission process of the non-time-sensitive data; the push port queue obtains a destination MAC address of the time-sensitive data or a destination MAC address of the non-time-sensitive data by querying a queue mapping relationship table and forwards the time-sensitive data or the non-time-sensitive data to the push port queue of the push port through a queue cross matrix based on the destination MAC address of the time-sensitive data or the destination MAC address of the non-time-sensitive data;

wherein, the pop port queue forwards the time-sensitive data or the non-time-sensitive data to a back-end link device according to priority;

wherein identifying the data type of the to-be-forwarded data frame based on the priority flag information of the to-be-forwarded data frame, comprises:

analyzing a priority flag, Priority Code Point, in an 802.1Q field of the to-be-forwarded data frame, to obtain the priority flag information of the to-be-forwarded data frame;

wherein a length of the priority flag, Priority Code Point, is 3 bits, identifying the data type of the to-be-forwarded data frame based on the priority flag information of the to-be-forwarded data frame, categorizing the to-be-forwarded data frame as the time-sensitive data or the non-time-sensitive data according to the data type of the to-be-forwarded data frame, comprises:

in response to determining that the priority flag of the to-be-forwarded data frame is a reserved empty byte, determining that the to-be-forwarded data frame is the non-time-sensitive data;

in response to determining that the priority flag of the to-be-forwarded data frame is 000, 001, 010, or 011, determining that the to-be-forwarded data frame is the time-sensitive data.

6. The time-sensitive switch according to claim 5, the operations further comprise:

extracting a VLAN field, a source MAC address filed, and a destination MAC address field of the to-be-forwarded data frame;

saving the VLAN field, the source MAC address filed, and the destination MAC address field of the to-be-forwarded data frame in the queue mapping relationship table in the storage medium.

7. The time-sensitive switch according to claim 5, wherein, in response to determining that the data type of to-be-forwarded data frame is the time-sensitive data, the push port queue and the pop port queue perform scheduling based on the priority of the time-sensitive data;

in response to determining that the data type of to-be-forwarded data frame is the non-time-sensitive data, the push port queue and the pop port queue do not distinguish priority, and perform Ethernet data frame exchange according to QoS mechanism.

8. The time-sensitive switch according to claim 5, wherein operation modes of the push port queue comprise: a discard mode, a port flow control mode, and a priority-based flow control mode;

in the discard mode, in response to the push port queue failing to identify congestion status, all frames received by the push port queue are evaluated by a congestion control function, wherein copied frames are discarded;

in the port flow control mode, the front-end link device is notified by a pause frame that the push port queue is not able to accept more data; in response to the front-end link device identifying a pause request, the push port queue does not discard any incoming data; in response to the front-end link device not identifying the pause frame, a buffer control function of the push port queue discards data when the data arrives at the push port queue;

in the priority-based flow control mode, in response to the front-end link device being notified of QoS class congestion policy in the push port queue by a pause frame, the front-end link device stops scheduling QoS class data frames; in response to the front-end link device not identifying the pause frame, a buffer control function of the push port queue discards data before the data arrives at the push port queue.

* * * * *